(12) United States Patent
Novo et al.

(10) Patent No.: US 6,719,263 B1
(45) Date of Patent: Apr. 13, 2004

(54) MULTI-PISTON VALVE ACTUATOR

(75) Inventors: Rui Novo, Lake Orion, MI (US); James O. Adas, Clinton, MI (US)

(73) Assignee: D-M-E Company, Madison Heights, MI (US)

( * ) Notice: Subject to any disclaimer, the term of this patent is extended or adjusted under 35 U.S.C. 154(b) by 53 days.

(21) Appl. No.: 10/246,961

(22) Filed: Sep. 20, 2002

(51) Int. Cl.[7] .............................................. F16K 31/12
(52) U.S. Cl. ........................... 251/31; 251/63; 251/63.5
(58) Field of Search ............................. 251/31, 62, 63, 251/63.5

(56) References Cited

U.S. PATENT DOCUMENTS

| | | | |
|---|---|---|---|
| 2,675,204 A | * 4/1954 | Johnson | 251/25 |
| 3,752,040 A | 8/1973 | Pawloski et al. | 91/411 |
| 3,880,051 A | 4/1975 | Eppler | 91/411 |
| 4,335,744 A | * 6/1982 | Bey | 137/522 |
| 5,191,825 A | 3/1993 | Beneteau et al. | 91/173 |
| 5,368,470 A | 11/1994 | Manner | 425/564 |
| 5,375,994 A | 12/1994 | Friderich et al. | 425/562 |
| 5,483,796 A | 1/1996 | Ando | 60/560 |
| 5,660,369 A | 8/1997 | Gauler | 251/63.5 |
| 6,386,508 B1 | 5/2002 | Steil et al. | 251/31 |

FOREIGN PATENT DOCUMENTS

JP 4320820 11/1992 ........... B29C/45/30

* cited by examiner

Primary Examiner—Edward K. Look
Assistant Examiner—John K Fristoe, Jr.
(74) Attorney, Agent, or Firm—John W. Gregg; Stephen H. Friskney

(57) ABSTRACT

A pressurized-fluid-operated actuator has multiple piston surfaces for providing increased output force. The actuator includes a stationary cylinder that contains a movable cylinder having multiple inner chambers separated by stationary inner pistons. The inner chambers are in fluid communication with extension and retraction ports provided in the stationary cylinder wall. Introduction of pressurized fluid into one port causes the fluid pressure to act on "n" piston surface(s) to retract the movable cylinder. Introduction of pressurized fluid into the other port causes the fluid pressure to act on "n+1" piston surfaces to provide an increased output force without increasing the diameters of the cylinders and without increasing the pressure of the fluid.

7 Claims, 5 Drawing Sheets

MULTI-PISTON VALVE ACTUATOR

BACKGROUND OF THE INVENTION

1. Field of the Invention

The present invention relates to a linear actuator having a plurality of piston surfaces for providing a higher output force upon application of a pressurized fluid to a given diameter actuator. More particularly, the present invention relates to a pressurized-fluid actuator of compact size and that includes a movable cylinder having one or more axially spaced piston surfaces for applying an actuating force for movement of the cylinder in a retraction direction, and at least one additional piston surface for applying additional actuating force for moving the cylinder in an extension direction.

2. Description of the Related Art

Linear actuators incorporating pistons that move within cylinders upon application of a pressurized fluid are well known in the art and are used for many different purposes. Generally, the output force provided by such actuators can be increased either by increasing the pressure of the fluid supplied to operate the actuator, or by increasing the diameter of the piston to increase the surface area of the piston. However, some applications require the actuator to be contained within a very limited space (so that the diameter of the piston cannot be increased). In such applications, the pressure necessary to provide the required actuating force may exceed practical limits. Accordingly, an alternative design is needed that will provide the required actuating force in a limited space at a reasonable pressure.

A number of actuator constructions have been devised in an effort to respond to the shortcoming described above. Although the prior art discloses various devices for providing increased output force from a pressurized-fluid operated actuator, the devices typically either involve a complex mechanism or otherwise fail to reduce the size of the actuator sufficiently to enable its use in a confined space.

SUMMARY OF THE INVENTION

Briefly stated, in accordance with one aspect of the present invention an actuator is provided that includes a stationary cylinder of tubular form that defines an inner cylindrical surface. A movable cylinder is slidably carried within the stationary cylinder and has a rod affixed thereto, the rod extending from the movable cylinder in an axial direction relative to the stationary cylinder. The movable cylinder divides the stationary cylinder into an upper chamber and a lower chamber. The movable cylinder also includes an inner cylindrical space.

A fixed piston extends transversely across the inner cylindrical space of the movable cylinder, thereby dividing the inner cylindrical space into a first inner chamber and a second inner chamber. A first fluid conduit is in communication with the upper chamber of the stationary cylinder and with the first inner chamber of the movable cylinder. Supplying a pressurized fluid to the first fluid conduit thus initiates movement of the movable cylinder and rod in a forward direction relative to the stationary cylinder, thereby providing a rod extension stroke. A second fluid conduit is in fluid communication with the second inner chamber for moving the movable cylinder and rod in a reverse direction relative to the stationary cylinder when pressurized fluid is introduced, thereby providing a rod retraction stroke.

In accordance with another aspect of the present invention, the actuator includes a stationary cylinder containing a movable cylinder that is divided into multiple inner chambers by fixed (stationary) pistons. The inner chambers are in fluid communication with extension and retraction ports provided in the cylinder wall. Introduction of pressurized fluid into the retraction port causes the fluid pressure to act on "n" piston surface(s) to retract the movable cylinder and rod, while introduction of pressurized fluid into the extension port causes the fluid pressure to act on "n+1" axially-spaced piston surfaces to extend the movable cylinder and rod. Accordingly, the actuator provides an increased extension force without increasing the overall diameter of the actuator and without increasing the pressure of the fluid.

DESCRIPTION OF THE PREFERRED EMBODIMENTS

Figure 1:
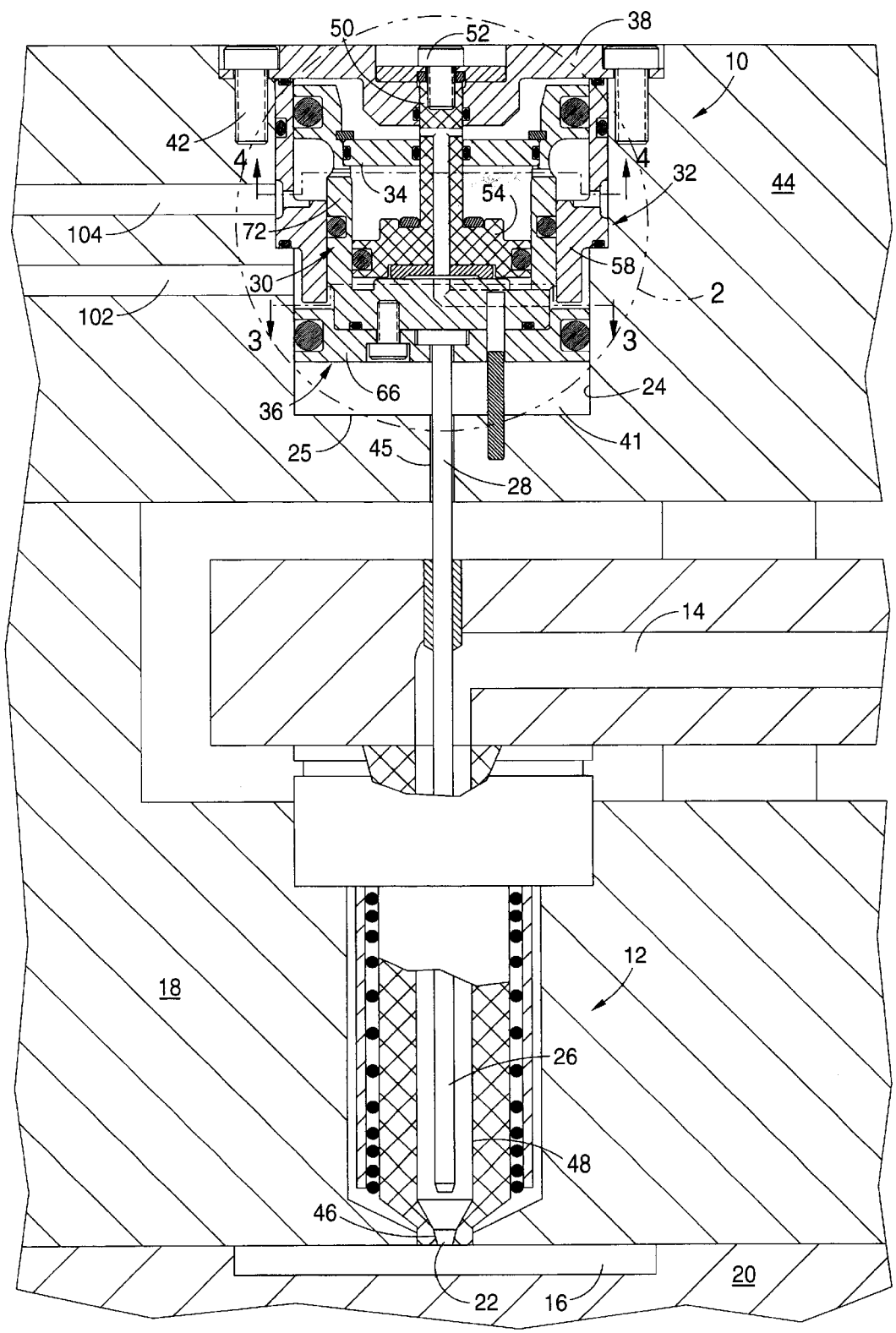
FIG. 1 is a fragmentary, side elevational view, partially in cross-section, of a portion of a mold assembly in an injection molding machine incorporating a linear actuator in accordance with the present invention operatively associated with a valve gate for controlling the flow of plasticated material to a mold cavity, wherein the movable cylinder is in a fully retracted position so that the valve pin is in the open position to allow flow of plastic melt into the mold cavity.
Figure 2:
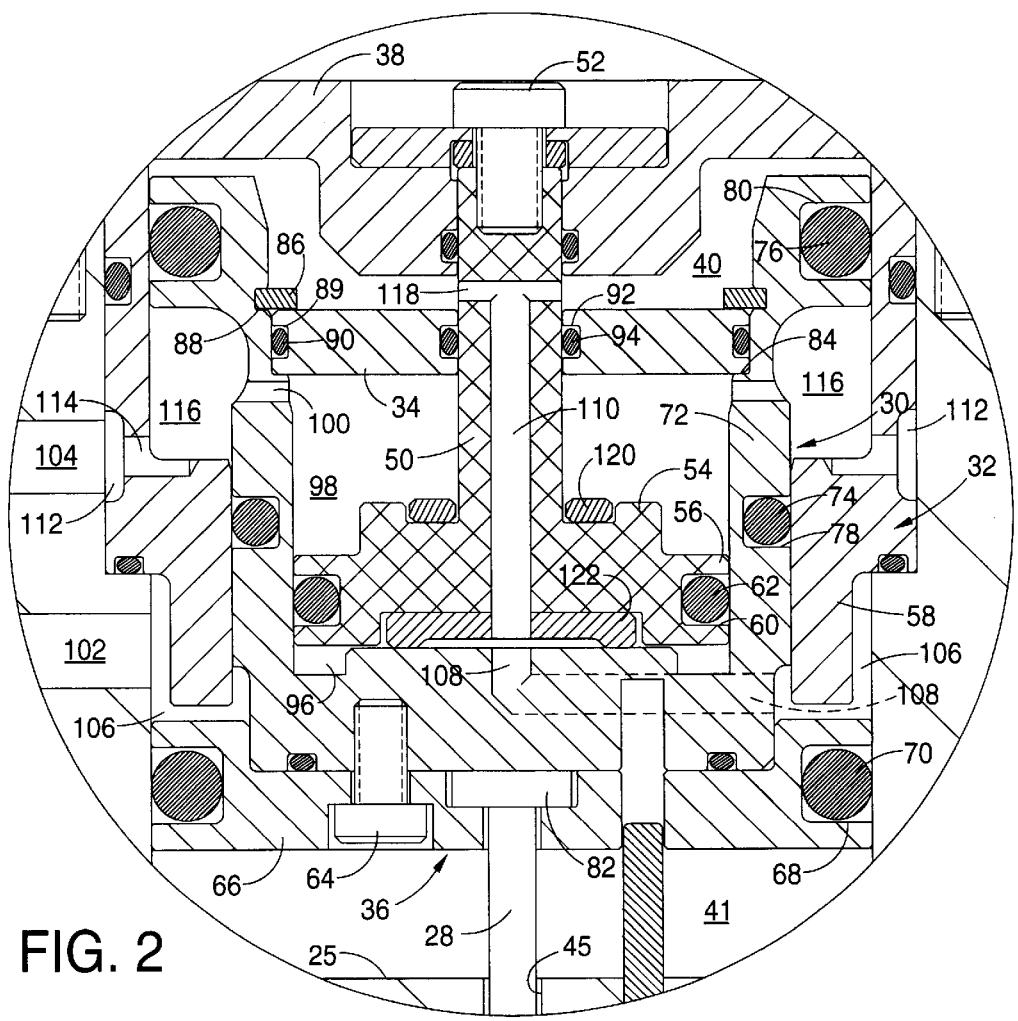
FIG. 2 is an enlarged view of the portion of FIG. 1 contained within the circle 2.
Figure 3:
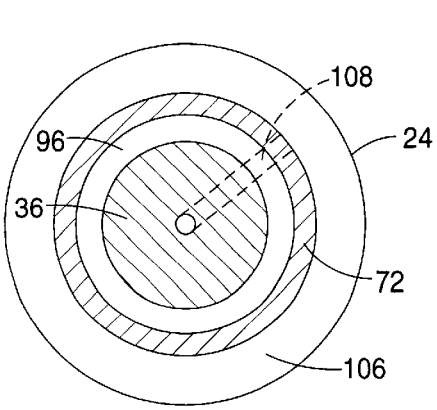
FIG. 3 is a cross-sectional view of the actuator in accordance with the present invention, taken along the line 3—3 of FIG. 1.
Figure 4:
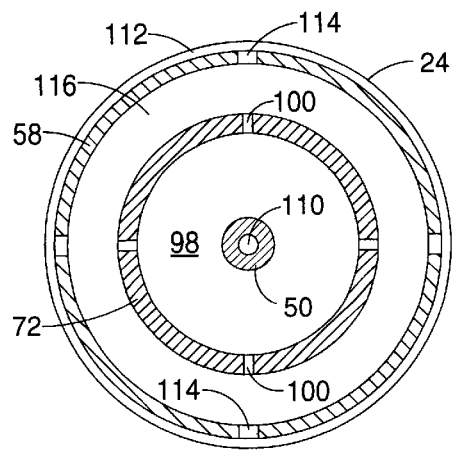
FIG. 4 is a cross-sectional view of the actuator in accordance with the present invention, taken along the line 4—4 of FIG. 1.

Referring first to FIGS. 1 and 2 of the drawings, there is shown a valve actuator 10 in accordance with the present invention. Operatively associated with the actuator 10 is a flow nozzle 12 for receiving a flow of molten plastic material from an injection unit (not shown) supplied via a molding material passageway 14. The nozzle 12 conveys and controls the supply of plastic melt to a mold cavity 16 that is defined by respective opposed, suitably-shaped recesses formed in a first mold segment 18 and a cooperating second mold segment 20. As will be appreciated by those skilled in the art, the first mold segment 18 is maintained in a stationary condition. The second mold segment 20 is supported for movement relative to the first mold segment 18 to define the closed mold cavity 16 when the mold segments 18, 20 are in contact, and to allow removal of a molded part by separating the mold segments 18, 20 to open the mold cavity 16.

During operation, the plastic melt from the injection unit is caused to flow through the molding material passageway 14 and into the nozzle 12. The nozzle 12 includes a discharge outlet or gate 22 that communicates directly with the mold cavity 16. Flow of the plastic melt through the nozzle 12 is controlled by a valve pin 26 that is movable toward and away from the gate 22 to close and open selectively the gate 22 at appropriate times during a molding cycle. As shown in FIG. 1, the valve pin 26 is in the retracted or open position, which will allow flow of plastic melt through the nozzle 12 and into the mold cavity 16.

The valve pin 26 is an end portion of an elongated rod 28 that has its opposite end connected to the actuator 10. More specifically, the actuator 10 includes two concentric cylinders, a movable cylinder 30 that connects to the rod 28, and a stationary cylinder 32 that slidably receives the movable cylinder 30. An upper end wall 34 and a lower end wall 36 serve to close the movable cylinder 30, so that it functions as a piston within the stationary cylinder 32, as will be more fully described later. An end cap 38 closes one end of the stationary cylinder 32 to define an upper chamber 40 between the end cap 38 and the upper end wall 34 of the movable cylinder 30. Preferably, the actuator 10 is contained within an appropriately sized bore 24 in a mold plate 44, and is held in place by appropriate fasteners, such as bolts 42 through the end cap 38. The mold plate 44 is suitably secured relative to the nozzle 12 in mold segment 18 so that the rod 28 and associated valve pin 26 are properly oriented relative to the valve seat 46 in the nozzle 12. As shown, the valve seat 46 includes a tapered passageway that diverges from the gate 22 to a cylindrical bore 48 that interconnects with the passageway 14.

Preferably, the stationary cylinder 32 has a stepped diameter to be received by the similarly stepped bore 24 in mold plate 44. This stepped design facilitates an economical assembly, using a fluid-tight seal between the stationary cylinder 32 and the bore 24, so that the lower portion of the bore 24 and the stationary cylinder 32 work together to contain the movable cylinder 30. This minimizes the overall length of the stationary cylinder 32 since the lower end wall 36 of the moving cylinder 30 seals against the lower portion of the bore 24 in the mold plate 44. Alternatively, the bore 24 in the mold plate 44 could be machined with a constant diameter to receive a stationary cylinder 32 having a straight diameter and extending to the bottom of the bore 24 to fully contain the movable cylinder 30. In either case, a lower chamber 41 is defined by the space between the lower end wall 36 and the bottom wall 25 of the bore 24 in plate 44. A bore 45 in the plate 44 is sized to allow passage of the rod 28 with sufficient clearance to provide a vent to ambient atmosphere for the lower chamber 41.

Within the stationary cylinder 32 a support post 50 rigidly connected to the end cap 38, as by a bolt 52, extends downwardly and passes through the upper end wall 34 and into the interior of the movable cylinder 30. The support post 50 terminates at a transversely-extending fixed piston 54. The fixed piston 54 is a disk-shaped member that has a peripheral edge 56 that is spaced inwardly of the inner surface of the cylinder side wall 58 of the stationary cylinder 32, so that the piston 54 is contained within the movable cylinder 30. The peripheral edge 56 preferably includes an annular recess 60 to receive a peripheral sealing ring 62.

The movable cylinder 30 is a hollow, generally cylindrical structure that is received within the stationary cylinder 32 and bore 24 for axial, sliding movement along the inner surfaces thereof. The annular lower end wall 36 of the cylinder 30 extends transversely inside the bore 24 just below the stationary cylinder 32. As shown, the lower end wall 36 can comprise two portions fastened together by bolts 64 to facilitate manufacture, as well as attachment of the rod 28 to the movable cylinder 30. The lower end wall 36 includes a flanged portion 66 with an outer peripheral recess 68 to receive a first outer sealing ring 70 on the movable cylinder 30, which is slidable along and that sealingly engages the inner surface of the bore 24. As shown, the lower end wall 36 with flanged portion 66 is positioned between the fixed piston 54 and the bottom wall 25 of the bore 24.

Extending axially from the periphery of the lower end wall 36 adjacent and along the inner surface of the cylinder side wall 58 and toward the end cap 38 is a tubular side wall 72 of the movable cylinder 30. A second outer sealing ring 74 and a third outer sealing ring 76 are each carried in annular recesses 78, 80, respectively, on the outer periphery of the side wall 72 of the movable cylinder 30, in axially spaced relationship with the first outer sealing ring 70 and in axially spaced relationship with each other. Each of the second and third sealing rings 74, 76 are slidable along and sealingly engage the inner surface of the cylinder side wall 58. The end 82 of the rod 28 opposite from the valve pin 26 is securely received within the flanged portion 66 of the lower end wall 36, so that both the movable cylinder 30 and the valve pin 26 move together.

Spaced axially along the side wall 72 from the lower end wall 36 and on the opposite side of the fixed piston 54 from the lower end wall 36 is the upper end wall 34 of the movable cylinder 30, extending across the interior space defined by the side wall 72. As shown most clearly in FIG. 2, the inner surface of the side wall 72 includes a radial step 84 against which the upper end wall 34 rests, and an annular retaining ring 86 is received in an inner peripheral groove 88 formed in the inner surface of the side wall 72 to retain the upper end wall 34 in position relative to the side wall 72. Additionally, the upper end wall 34 preferably includes an outer peripheral recess 89 to receive a sealing ring 90, as well as an inner annular recess 92 to receive a sealing ring 94, to facilitate a fluid tight seal of the upper end wall 34 with the side wall 72 and support post 50, respectively.

Figure 5:
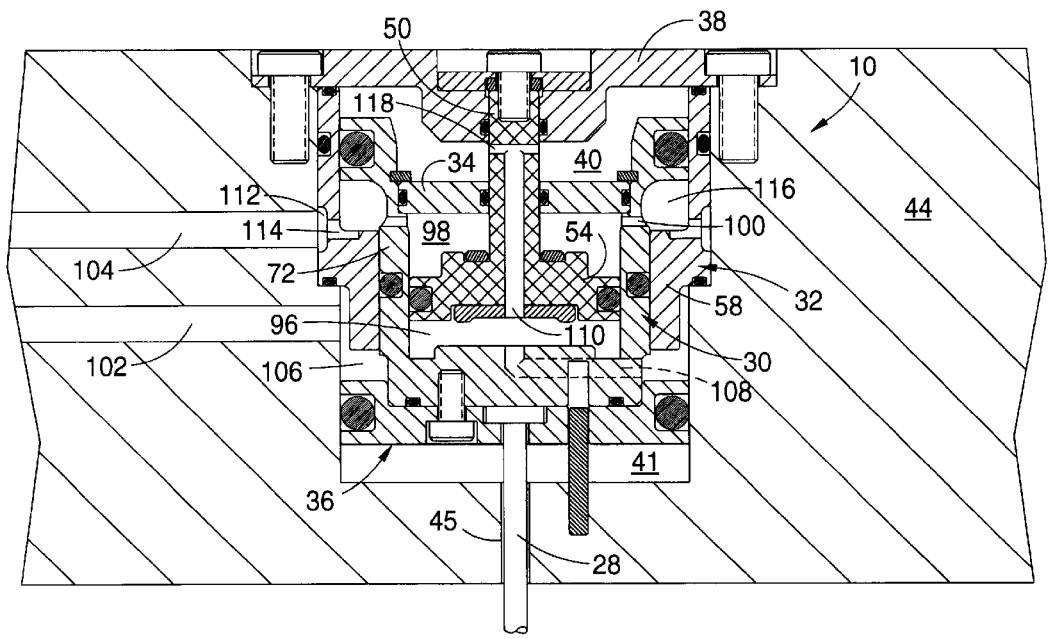
FIG. 5 is a partial side elevational view similar to that of FIG. 1, showing the movable cylinder of the actuator in an intermediate position between fully retracted and fully extended positions.

As best seen in FIG. 5, the volume between the lower end wall 36 and the fixed piston 54 defines a first inner chamber 96 within the cylinder 30, and the annular volume between the upper end wall 34 and the fixed piston 54 defines a second inner chamber 98 within the cylinder 30. The side wall 72 includes radially-extending openings 100 that provide fluid communication with the second inner chamber 98, as will be more fully explained later.

A first port 102 and second port 104 in the mold plate 44 open into the bore 24, each of the ports 102, 104 being adapted to be alternately in communication with either a source of pressurized fluid (not shown), such as pressurized gas or pressurized hydraulic fluid, or with a lower pressure fluid reservoir (not shown). The connections between the ports 102, 104 and the respective pressurized fluid source and lower pressure fluid reservoir can be effected through a suitable reversible flow control valve (not shown) of a type that is well known to those skilled in the art. The first port 102 connects with an annular chamber 106 surrounding the lower portion of the stationary cylinder side wall 58 and adjacent the lower end wall 36 of the movable cylinder 30. The annular chamber 106 communicates with both the first inner chamber 96 and the upper chamber 40 of the stationary cylinder 32 via a passage 108 in the lower end wall 36. More specifically, the passage 108 opens into the first inner chamber 96, which communicates with the upper chamber 40 via a second passage 110 and radial openings 118 in the support post 50 of the fixed piston 54, thus enabling fluid communication of the first port 102 with both the first inner chamber 96 and upper chamber 40.

The second port 104 terminates at a channel 112 that connects with radial openings 114 through the side wall 58 of the stationary cylinder 32. The radial openings 114 communicate with an annular chamber 116 around the upper portion of the movable cylinder 30. The annular chamber 116 connects with the second inner chamber 98 through the radially-extending openings 100 in the side wall 72 just below the radial step 84, thereby enabling fluid communication between the second port 104 and the second inner chamber 98 of the movable cylinder 30.

The actuator 10 is shown in FIGS. 1 and 2 with the movable cylinder 30, rod 28, and valve pin 26 each in their retracted positions, relative to the stationary cylinder 32 and to the valve seat 46. In operation, to cause the valve pin 26 and cylinder 30 to move from their retracted positions, pressurized fluid is introduced through the first port 102, while the second port 104 is in fluid communication with a lower pressure fluid reservoir, or the like. The introduction of pressurized fluid at the first port 102 causes the pressurized fluid to enter into and to flow through the annular channel 106, then through the first passage 108 and into the first inner chamber 96 within the cylinder 30. Simultaneously, a portion of the pressurized fluid flows from the first inner chamber 96 into and through the second passage 110 and radial openings 118 to enter into the upper chamber 40. Consequently, each of the upper chamber 40 and the first inner chamber 96 are at an elevated pressure, relative to the lower chamber 41, which is vented to the atmosphere through the bore 45 around rod 28, and relative to the second inner chamber 98. The second inner chamber 98 is in fluid communication with the lower pressure fluid reservoir through the openings 100, annular chamber 116, radial openings 114, annular channel 112, and second port 104.

Figure 6:
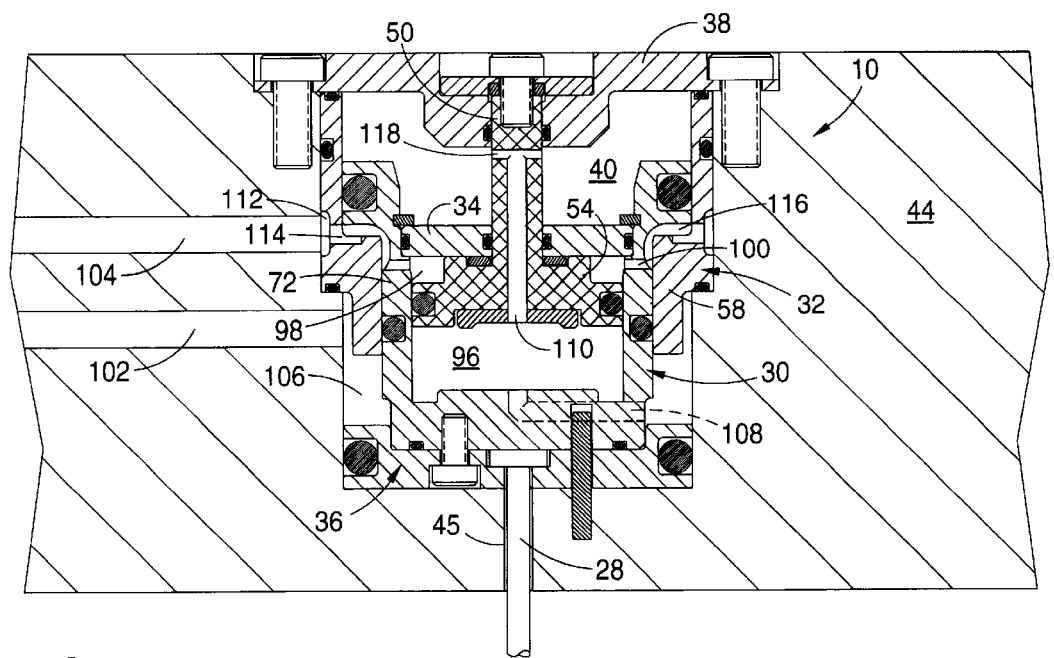
FIG. 6 is a partial side elevational view similar to that of FIGS. 1 and 5 showing the movable cylinder of the actuator in a fully extended position.

The resultant pressure differentials acting against each of the upper end wall 34 and lower end wall 36 cause the cylinder 30 to move toward the bottom wall 25 of the bore 24, which causes the valve pin 26 to move toward the valve seat 46; i.e., from the position shown in FIG. 1 through an intermediate position, such as that shown in FIG. 5. For the time during which the cylinder 30 and valve pin 26 are moving in this manner, the volume of each of the lower chamber 41 and the second inner chamber 98 is decreasing, while the volume of each of the first inner chamber 96 and upper chamber 40 is increasing. At the same time, any fluid within the second inner chamber 98 passes through the openings 100, into annular chamber 116, through radial openings 114, into annular channel 112, and finally out through the second port 104, which is at a lower pressure than the first port 102. The continued application of greater fluid pressure at the first port 102 will cause the cylinder 30 to travel to the end of its extension stroke, as shown in FIG. 6. Upon completion of the extension stroke, the upper end wall 34 makes contact with a forward cushion 120 attached to the fixed piston 54 and the end of the valve pin 26 is held tightly against the valve seat 46 to block flow through the gate 22. To avoid a pressure build-up that would act against the lower end wall 36, air contained within the lower chamber 41 is exhausted through the bore 45.

In order to move the actuator 10 from the extended position shown in FIG. 6, thereby opening the gate 22 and allowing the flow of molten plastic material into the mold cavity 16, the first port 102 must be disconnected from the source of pressurized fluid and is placed in communication with a lower pressure reservoir, or the like. The second port 104 is then connected with the source of pressurized fluid, and pressurized fluid enters the annular channel 112 through the second port 104. From the annular channel 112 the pressurized fluid flows through the radial openings 114 in the side wall 58 and into the second inner chamber 98 within the cylinder 30. The entry of pressurized fluid into the second inner chamber 98 applies a force against the inner surface the upper end wall 34, causing the cylinder 30 and the valve pin 26 to retract into the stationary cylinder 32 until it reaches the position shown in FIG. 1, where the lower end wall 36 makes contact with a retract cushion 122 attached to the fixed piston 54. As a result, the valve pin 26 retracts into the nozzle 12 and away from the gate 22 to allow molding material to flow through the nozzle 12 and into the mold cavity 16. The partial vacuum that would otherwise be generated within the lower chamber 41 is relieved by allowing ambient air to enter the lower chamber 41 through the bore 25 around the rod 28.

Figure 7:
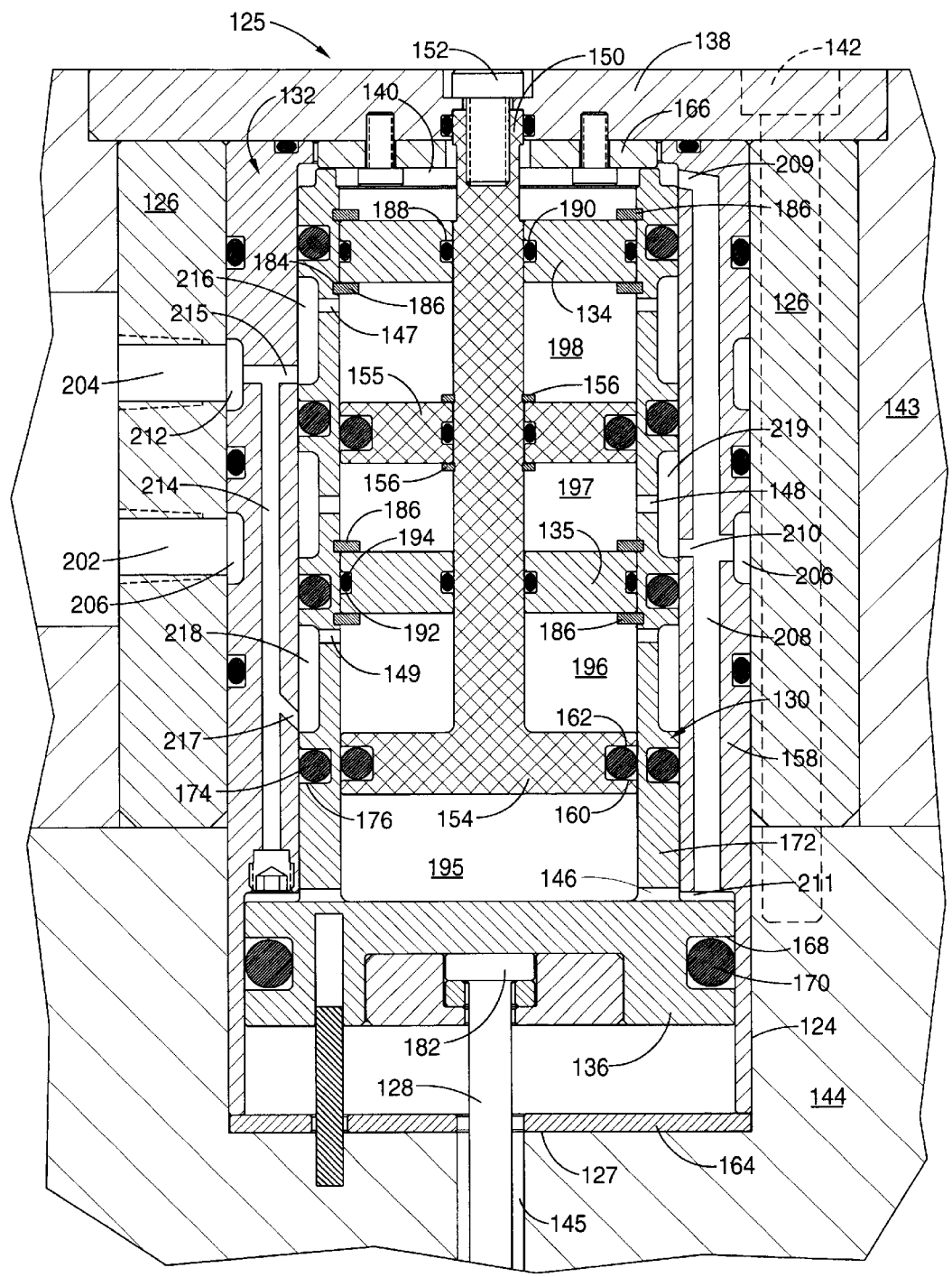
FIG. 7 is a fragmentary, side elevational view, partially in cross-section, of a portion of a mold assembly, showing an alternate embodiment of an actuator in accordance with the present invention capable of providing increased actuating force, wherein the movable cylinder of the actuator is in a fully retracted position.
Figure 8:
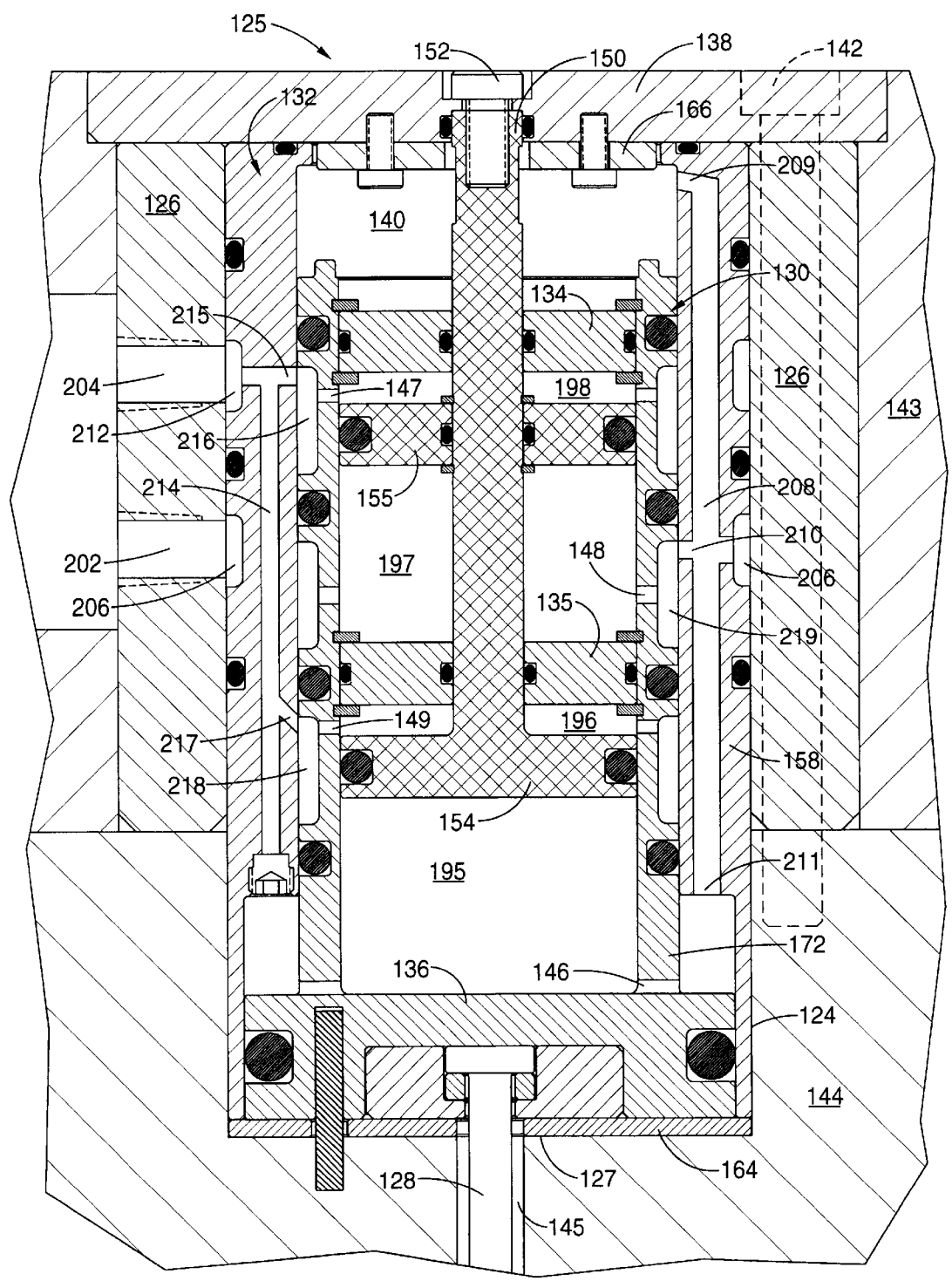
FIG. 8 is a partial side elevational view of the same alternate embodiment shown in FIG. 7, wherein the movable cylinder of the actuator in a fully extended position.

FIGS. 7 and 8 show an alternate embodiment of a valve actuator 125 in accordance with the present invention that employs additional surfaces to further enhance the actuation force. The actuator 125 has an outer housing 126 and end cap 138 that are received in a mold plate 143. A stationary cylinder 132 is received within the interior space defined by the housing 126, the end cap 138 and a bore 124 in adjacent mold plate 144 that matches the inside diameter of the housing 126. Preferably, bolts 142 passthrough the end cap 138 and housing 126 to engage the underlying mold plate 144 to fix the actuator 125 in the mold assembly. Alternatively, the stationary cylinder 132 could be received within mating bores in the mold plates 143, 144 or within a single mold plate, as in the previously described embodiment, eliminating the need for the outer housing 126. A movable cylinder 130 is slidably received within the stationary cylinder 132. An elongated rod 128 has one end 182 securely received within a lower end wall 136 of the movable cylinder 130, so that both the movable cylinder 130 and the rod 128 move together, with the opposite end of the rod 128 functioning as a valve pin, as previously described. The end cap 138 closes one end of the stationary cylinder 132 to define an upper chamber 140 between an upper wall 134 of the movable cylinder 130 and the end cap 138. A bottom wall 127 of the bore 124 closes the opposite end of the stationary cylinder 132 to fully contain the movable cylinder 130.

The actuator 125 includes a first port 202 and a second port 204, each of which is alternately adapted to be in communication with a source of pressurized fluid (not shown), such as pressurized gas or pressurized hydraulic fluid, and with a lower pressure fluid reservoir (not shown), as described previously. The first port 202 extends through the outer housing 126 and terminates at a channel 206 that connects with a first passage 208 contained in a tubular side wall 158 of the cylinder 132. The first passage 208 opens at one end 209 into the upper chamber 140, as well as an intermediate point 210 and an opposite end 211 to enable fluid communication between the first port 202 and the interior of the movable cylinder 130 for purposes that will be hereinafter explained. The second port 204 extends through the outer housing 126 and terminates at a channel 212 that connects with a second passage 214 contained in the wall 158 of the cylinder 132. The second passage 214 opens at one end 215 into an annular channel 216, as well as at an opening 217 to a second annular channel 218 to enable fluid communication between the second port 204 and the interior of the movable cylinder 130.

The movable cylinder 130 is a hollow, generally cylindrical structure that is received within the stationary cylinder 132 for axial, sliding movement along the inner surface thereof. The movable cylinder 130 includes an annular lower wall 136 that extends transversely to seal against the inside the cylinder 132. The lower end wall 136 includes an outer peripheral recess 168 to receive a first outer sealing ring 170 that is slidable along and that sealingly engages the inner surface of the cylinder 132. Extending axially from the periphery of the lower end wall 136 adjacent and along the inner surface of the wall 158 of the cylinder 132 and toward the end cap 138 is a tubular side wall 172. The annular upper end wall 134 extends across the interior of the end of the movable cylinder 130 adjacent the end cap 138. The upper end wall 134 is held in place by retaining rings 186 in grooves 184 in the side wall 172. Four outer sealing rings 174 are each carried in annular recesses 176 on the outer periphery of the side wall 172 in axially spaced relationship with the first outer sealing ring 170 and in axially spaced relationship with each other. Each of the outer sealing rings 174 is slidable along and sealingly engages the inner surface of the side wall 158 of the stationary cylinder 132.

Attached to the end cap 138 by a bolt 152 is a support post 150 that passes through the upper end wall 134 of the cylinder 130 and extends into the interior of the cylinder 130 to terminate at a transversely-extending, first fixed piston 154. A second fixed piston 155 is attached to the support post 150 by suitable means, such as retaining rings 156, at a position intermediate the end cap 138 and the first fixed piston 154. The fixed pistons 154, 155 are disk-shaped members that are sized to be received within the tubular side wall 172. The peripheral edge of each of the fixed pistons 154, 155 includes an annular recess 160 to receive a peripheral sealing ring 162. Spaced axially along the side wall 172 from the lower end wall 136 and between the fixed pistons 154, 155 is an intermediate wall 135 that extends across the interior of the movable cylinder 130 and is attached to the side wall 172 by retaining rings 186. The intermediate wall 135 and upper end wall 134 can include interior and peripheral recess 188, 192 to receive an annular sealing rings 190, 194, as shown.

The volume between the lower end wall 136 and the first fixed piston 154 defines a first chamber 195 within the movable cylinder 130. The annular volume between the first fixed piston 154 and the intermediate wall 135 defines a second chamber 196. The annular volume between the intermediate wall 135 and the second fixed piston 155 defines a third chamber 197, and the annular volume between the upper end wall 134 and the second fixed piston 155 defines a fourth chamber 198 within the movable cylinder 130. The side wall 172 includes radially extending openings 146 to allow fluid communication between the first inner chamber 195 and the first passage 208 through the end opening 211. Similar openings 149 provide a passage between the second inner chamber 196 and the annular channel 218, openings 148 provide a passage between the third inner chamber 197 and the annular channel 219, and openings 147 provide a passage between the fourth inner chamber 198 and the annular channel 216.

With the actuator 125 constructed as described, the upper chamber 140, the first chamber 195 and the third chamber 197 are in continuous fluid communication with the first passage 208, and thereby with the first port 202 via annular channel 206. Similarly, the second chamber 196 and fourth chamber 198 are in continuous communication with the second passage 214 and thereby with the second port 204 via channel 212.

The actuator 125 is shown in FIG. 7 with the movable cylinder 130 and rod 128 (and the associated valve pin) each in their retracted positions, relative to the stationary cylinder 132. In operation, to cause the valve pin and movable cylinder 130 to move from their retracted positions, pressurized fluid is introduced through the first port 202, while the second port 204 is in fluid communication with a lower pressure fluid reservoir, or the like. The introduction of pressurized fluid at the first port 202 causes the pressurized fluid to enter into and to flow through the annular channel 206 and into the first passage 208. The fluid then flows simultaneously through (a) opening 209 into the upper chamber 140, (b) opening 210 to channel 219, through the openings 148 and into the third chamber 197, and (c) opening 211, through openings 146 and into the first chamber 195. Consequently, each of the upper chamber 140, the third chamber 197 and the first chamber 195 are at an elevated pressure relative to the second and fourth chambers 196, 198. The resultant pressure differentials acting against each of the upper end wall 134, intermediate wall 135 and lower end wall 136 cause the movable cylinder 130 to move toward the bottom wall 127, i.e., from the positions shown in FIG. 7 to the positions shown in FIG. 8.

As the movable cylinder 130 moves from the retracted position to the extended position, the volume of each of the fourth chamber 198 and the second chamber 196 is decreasing, while the volume of each of the first chamber 195, third chamber 197 and upper chamber 140 is increasing. At the same time, any fluid within the forth chamber 198 and second chamber 196 passes through the channels 218, 216, through the passage 214 and out the second port 204, which is at a lower pressure than is the first port 202. The continued application of greater fluid pressure at the first port 202 will cause the movable cylinder 130 to travel to the end of its extension stroke, as shown in FIG. 8, at which position the lower end wall 136 is in abutment with a forward cushion 164 attached to the bottom wall 127, and the valve pin will be against the valve seat to block flow through the mold gate. To avoid the resistance that would otherwise act against the lower end wall 136, air contained between the lower end wall 136 and the bottom wall 127 is exhausted through a bore 145 in the mold plate 144 through which the rod 128 also passes.

In order to open the valve and allow the flow of molten plastic material into the mold cavity, the first port 202 is disconnected from the source of pressurized fluid and is placed in communication with a lower pressure reservoir, or the like. The second port 204 is then connected with the source of pressurized fluid, and pressurized fluid enters the channel 212, flows into the passage 214, and then into the annular channels 216, 218 via the openings 215, 217. From the annular channels 216, 218, the pressurized fluid flows through the openings 147, 149 in the side wall 172 and into the fourth chamber 198 and second chamber 196. The increased pressure against the inner surface of the upper end wall 143 and intermediate wall 135 causes the movable cylinder 130 to retract into the stationary cylinder 132. As a result, the valve pin retracts away from the gate to allow molding material to flow through the nozzle. The reduced air pressure that would otherwise be generated between the lower end wall 136 and the bottom wall 127 is relieved by admitting ambient air through the bore 145 surrounding the rod 128.

It will therefore be apparent that an actuator in accordance with the present invention provides a greater output force within the same cylinder diameter, thereby allowing such an actuator to be utilized in confined spaces that would preclude larger diameter cylinders if higher actuation forces were needed. If a similar space limitation existed but a higher actuation force than would be available using a single piston were needed with only a relatively low fluid pressure source available, the actuator in accordance with the present invention would provide an increased actuation force at that lower fluid pressure. In addition, as illustrated by the alternate embodiment, the actuation force can be further multiplied, as desired, by repeating the described arrangement of the fixed pistons and intermediate movable cylinder walls, thereby increasing the number of actuating surfaces.

The foregoing discussion and the illustrated embodiments of the invention have been in the context of the use of the actuator in a plastics injection molding machine for controlling the flow of molten plastic material from an injection unit to a mold cavity, to provide increased actuation forces where space is limited or where available fluid pressures are low. It will be apparent to those skilled in the art that various changes and modification can be made without departing from the concepts of the present invention. It is therefore intended to encompass within the appended claims all such changes and modification that fall within the scope of the present invention.

What is claimed is:

1. An actuator for operating a valve gate to supply a flow of plastic melt intermittently into a mold cavity of a mold assembly, said actuator comprising:
 a) a stationary cylinder bounded by an end cap and a bottom wall;
 b) a movable cylinder received within the stationary cylinder, the movable cylinder having a generally cylindrical outer wall and generally flat upper and lower end walls, wherein the upper end wall is proximate the end cap of the stationary cylinder, such that an upper chamber is defined by the space between the upper end wall of the movable cylinder and the end cap of the stationary cylinder;
 c) a stationary piston received within the movable cylinder, thereby defining (i) a first inner chamber between the lower end wall and the stationary piston and (ii) a second inner chamber between the upper end wall and the stationary piston;
 d) a support post connecting the stationary piston to the end cap of the stationary cylinder;
 e) a rod attached to the lower end wall of the movable cylinder, the rod having an end portion configured to form a valve pin at a point proximate a gate to the mold cavity;
 f) a first port communicating with the upper chamber and the first inner chamber; and
 g) a second port communicating with the second inner chamber, such that admission of pressurized fluid through the first port generates forces acting on both end walls of the movable cylinder, thereby moving the valve pin to shut off flow to the gate, and admission of pressurized fluid through the second port generates a force acting on the upper end wall of the movable piston, thereby moving the valve pin to an open position, allowing flow through the gate and into the mold cavity.

2. An actuator in accordance with claim 1, wherein the actuator further comprises:
 h) an intermediate wall within the movable cylinder, positioned between the upper end wall and the stationary piston;
 i) a second stationary piston received within the movable cylinder and attached to the support post at a location between the intermediate wall and the upper end wall of the movable cylinder, such that
  i) the second inner chamber is defined by the space between the intermediate wall and the stationary piston,
  ii) a third inner chamber is defined by the space between the intermediate wall and the second stationary piston, and is in fluid communication with the first fluid conduit, and
  iii) a fourth inner chamber is defined by the space between the second stationary piston and the upper end wall, and is in fluid communication with the second fluid conduit.

3. An actuator in accordance with claim 2, wherein the first fluid conduit comprises a first passage contained within a wall of the stationary cylinder, the first passage having an end opening communicating with the upper chamber, an intermediate opening communicating with the third inner chamber, and an opposite end opening communicating with the first inner chamber.

4. An actuator in accordance with claim 2, wherein the second fluid conduit comprises a second passage contained within a wall of the stationary cylinder, the passage having a first opening communicating with the fourth inner chamber, and a second opening communicating with the second inner chamber.

5. An actuator in accordance with claim 2, wherein
 j) the first fluid conduit comprises a first passage contained within a wall of the stationary cylinder, the first passage having an end opening communicating with the upper chamber, an intermediate opening communicating with the third inner chamber, and an opposite end opening communicating with the first inner chamber, and
 k) the second fluid conduit comprises a second passage contained within the wall of the stationary cylinder, the passage having a first opening communicating with the fourth inner chamber, and a second opening communicating with the second inner chamber.

6. An actuator for operating a valve gate to supply a flow of plastic melt intermittently into a mold cavity of a mold assembly, said actuator comprising:
 a) a stationary cylinder bounded by an end cap and a bottom wall;
 b) a movable cylinder received within the stationary cylinder, the movable cylinder having a generally cylindrical outer wall and generally flat upper end wall, intermediate wall and lower end wall, wherein the upper end wall is proximate the end cap of the stationary cylinder, such that an upper chamber is defined by the space between the upper end wall of the movable cylinder and the end cap of the stationary cylinder;
 c) a first stationary piston received between the lower end wall and intermediate wall of the movable cylinder, thereby defining (i) a first inner chamber between the lower end wall and the first stationary piston and (ii) a second inner chamber between the intermediate wall and the first stationary piston;
 d) a second stationary piston received between the upper end wall and intermediate wall of the movable cylinder, thereby defining (i) a third inner chamber between the intermediate wall and the second stationary piston and (ii) a fourth inner chamber between the upper end wall and the second stationary piston;
 e) a support post connecting the first and second stationary pistons to the end cap of the stationary cylinder;

f) a rod attached to the lower end wall of the movable cylinder, the rod having an end portion configured to form a valve pin at a point proximate a gate to the mold cavity;

g) a first port communicating with the upper chamber, the first inner chamber and the third inner chamber; and h) a second port communicating with the second inner chamber and the fourth inner chamber, such that admission of pressurized fluid through the first port generates forces acting on both end walls and the intermediate wall of the movable cylinder, thereby moving the valve pin to shut off flow to the gate, and admission of pressurized fluid through the second port generates a force acting on the upper end wall and the intermediate wall of the movable piston, thereby moving the valve pin to an open position, allowing flow through the gate and into the mold cavity.

7. An actuator for operating a valve gate to supply a flow of plastic melt intermittently into a mold cavity of a mold assembly, said actuator comprising:

a) a stationary cylinder bounded by an end cap and a bottom wall;

b) a movable cylinder received within the stationary cylinder, the movable cylinder having a generally cylindrical outer wall, generally flat upper and lower end walls, and "n" intermediate walls between the upper and lower end walls to define "n+1" cavities within the movable cylinder; the upper end wall of the movable cylinder being proximate the end cap of the stationary cylinder so that the space between the upper end wall of the movable cylinder and the end cap of the stationary cylinder defines an upper chamber;

c) a stationary piston received within each cavity of the movable cylinder, thereby dividing each cavity into "a" and "b" inner chambers;

d) a support post connecting all of the stationary pistons to the end cap of the stationary cylinder;

e) a rod attached to the lower end wall of the movable cylinder, the rod having an end portion configured to form a valve pin at a point proximate a gate to the mold cavity;

f) a first port communicating with the upper chamber and all of the "a" inner chambers of the movable cylinder; and g) a second port communicating with all of the "b" inner chambers of the movable cylinder, such that admission of pressurized fluid through the first port generates forces acting on both end walls and the intermediate walls of the movable cylinder, thereby moving the valve pin to shut off flow to the gate, and admission of pressurized fluid through the second port generates a force acting on the upper end wall and the intermediate walls of the movable piston, thereby moving the valve pin to an open position, allowing flow through the gate and into the mold cavity.

* * * * *